US012106551B2

(12) United States Patent
Huang et al.

(10) Patent No.: US 12,106,551 B2
(45) Date of Patent: Oct. 1, 2024

(54) VISUAL ENHANCEMENT METHOD AND SYSTEM BASED ON FUSION OF SPATIALLY ALIGNED FEATURES OF MULTIPLE NETWORKED VEHICLES

(71) Applicant: ZHEJIANG LAB, Zhejiang (CN)

(72) Inventors: Qian Huang, Hangzhou (CN); Zhifeng Zhao, Hangzhou (CN); Yongdong Zhu, Hangzhou (CN); Yuntao Liu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/493,833

(22) Filed: Oct. 25, 2023

(65) Prior Publication Data
US 2024/0062533 A1    Feb. 22, 2024

Related U.S. Application Data

(63) Continuation of application No. PCT/CN2023/082964, filed on Mar. 22, 2023.

(30) Foreign Application Priority Data

Mar. 29, 2022    (CN) .......................... 202210317048.x

(51) Int. Cl.
*G06V 10/80* (2022.01)
*G06T 7/73* (2017.01)
(Continued)

(52) U.S. Cl.
CPC ............... *G06V 10/806* (2022.01); *G06T 7/73* (2017.01); *G06V 10/247* (2022.01);
(Continued)

(58) Field of Classification Search
CPC ............... G06V 10/806; G06V 10/247; G06V 10/7715; G06V 10/82; G06V 20/58;
(Continued)

(56) References Cited

U.S. PATENT DOCUMENTS 9,177,225 B1    11/2015   Cordova-Diba et al.
11,927,668 B2 *  3/2024   Fontijne ................ G01S 13/931
(Continued)

FOREIGN PATENT DOCUMENTS

CN    107392092 A    11/2017
CN    108983248 A    12/2018
(Continued)

OTHER PUBLICATIONS

International Search Report (PCT/CN2023/082964); Date of Mailing: Jun. 20, 2023.
(Continued)

*Primary Examiner* — Xuemei G Chen
(74) *Attorney, Agent, or Firm* — W&G Law Group

(57) ABSTRACT

The present application discloses a visual enhancement method and a system based on fusion of spatially aligned features of multiple networked vehicles. The method utilizes the visual features of networked vehicles themselves and their surroundings within a certain range, and performs feature fusion after spatial alignment to realize visual expansion and enhancement. After receiving the compressed intermediate feature map of the networked vehicles in a certain range around, the decompressed intermediate feature map is subjected to affine transformation, and the transformed aligned feature map is subjected to feature fusion based on a designed multi-feature self-learning network, so as to realize the complementation and enhancement among features while removing redundant features. The fused intermediate features are used to detect the target obstacles from the perspective of the networked vehicle itself and partially or completely blocked, thus improving the safety of driving connected vehicles.

9 Claims, 5 Drawing Sheets

(51) Int. Cl.
*G06V 10/24* (2022.01)
*G06V 10/77* (2022.01)
*G06V 10/82* (2022.01)
*G06V 20/58* (2022.01)
*G06V 20/70* (2022.01)

(52) U.S. Cl.
CPC .......... *G06V 10/7715* (2022.01); *G06V 10/82* (2022.01); *G06V 20/58* (2022.01); *G06V 20/70* (2022.01); *G06T 2207/20084* (2013.01); *G06T 2207/30261* (2013.01)

(58) Field of Classification Search
CPC .......... G06V 20/70; G06V 20/56; G06T 7/73; G06T 2207/20084; G06T 2207/30261; G06T 3/02; G06F 18/00; G06F 18/253; G06F 18/214; G06N 3/04; G06N 3/08
See application file for complete search history.

(56) References Cited

U.S. PATENT DOCUMENTS

| | | | |
|---|---|---|---|
| 2020/0280429 A1* | 9/2020 | Su | G01S 17/931 |
| 2020/0285911 A1* | 9/2020 | Guo | G06V 10/82 |
| 2021/0118146 A1* | 4/2021 | Rhodes | G06N 3/045 |
| 2021/0125498 A1 | 4/2021 | Munger et al. | |
| 2021/0190958 A1* | 6/2021 | Nonaka | G01S 7/4817 |
| 2022/0108544 A1* | 4/2022 | Becker | G06T 7/73 |
| 2023/0097594 A1* | 3/2023 | Hirai | B60W 30/00 706/27 |
| 2023/0206063 A1* | 6/2023 | Condurache | G06N 3/045 706/25 |
| 2023/0267720 A1* | 8/2023 | Marvasti | G06V 10/42 382/155 |

FOREIGN PATENT DOCUMENTS

| | | |
|---|---|---|
| CN | 109711352 A | 5/2019 |
| CN | 111432017 A | 7/2020 |
| CN | 112113578 A | 12/2020 |
| CN | 112509032 A | 3/2021 |
| CN | 113255659 A | 8/2021 |
| CN | 113486726 A | 10/2021 |
| CN | 113740837 A | 12/2021 |
| CN | 113947766 A | 1/2022 |
| CN | 114091598 A | 2/2022 |
| CN | 114419605 A | 4/2022 |

OTHER PUBLICATIONS

First Office Action(CN202210317048.X); Date of Mailing: May 18, 2022.
Notice Of Allowance(CN202210317048.X); Date of Mailing: May 31, 2022.

* cited by examiner

VISUAL ENHANCEMENT METHOD AND SYSTEM BASED ON FUSION OF SPATIALLY ALIGNED FEATURES OF MULTIPLE NETWORKED VEHICLES

CROSS-REFERENCE TO RELATED APPLICATIONS

The present application is a continuation of International Application No. PCT/CN2023/082964, filed on Mar. 22, 2023, which claims priority to Chinese Application No. 202210317048.X, filed on Mar. 29, 2022, the contents of both of which are incorporated herein by reference in their entireties.

TECHNICAL FIELD

The present application relates to the technical field of intelligent networked vehicles and in particular, to a visual enhancement method and a system based on fusion of spatially aligned features of multiple networked vehicles.

BACKGROUND

In the future, China will promote the coordinated development of intelligent networked vehicles and smart cities. V2X vehicle-road collaboration can achieve the interoperability between vehicles through the information communication between intelligent networked vehicles, and further achieve the safety of advanced automatic driving at L4 and above. At present, intelligence of a single vehicle mostly utilizes the sensing equipment of the intelligent vehicle to sense the surrounding environment, and the accuracy of target detection within the visual range has reached a high level, but it is impossible to detect obstacles that are partially blocked or completely blocked in the traffic environment, which leads to a threat of vehicle driving safety. Therefore, with the cooperation of V2X vehicles, V2V inter-vehicle communication has also received more attention.

At present, the inter-vehicle communication mostly adopts semantic communication or original data transmission methods. Semantic communication method refers to the direct transmission of result information. However, this kind of semantic communication results in a certain degree of loss of original information due to the oversimplified information conveyed, while the original data transmission method leads to a long transmission time due to the large amount of original data, which makes it difficult to guarantee the real-time information and limits driving safety.

SUMMARY

In view of the shortcomings of the existing networked vehicle visual detection technology, the object of the present application is to provide a visual enhancement method and system based on the fusion of spatially aligned features of multiple networked vehicles to solve the problem of low driving safety of networked vehicles caused by the fact that the existing networked vehicles target detection method cannot accurately detect obstacles that are partially or completely blocked. According to the method, a visual enhancement method based on fusion of spatially aligned features of multiple networked vehicles is introduced, the intermediate feature maps of visual images of a networked vehicles and the surrounding networked vehicles in a certain range are subjected to spatial alignment, and the spatially aligned intermediate feature maps are fused at the feature level based on a multi-feature self-learning mechanism, so that the visual enhancement of networked vehicles is realized, and the accuracy and success rate of vision-based obstacle detection of networked vehicles are improved.

The object of the present application is achieved through the following technical solution: in a first aspect, the present application provides a visual enhancement method based on fusion of spatially aligned features of multiple networked vehicles, which includes the following steps:

(1) Installing a forward-looking central camera on a roof of each networked vehicle.

(2) Adding a network unit based on a multi-feature self-learning mechanism between a semantic feature extraction part and a detection head part in a target detection network based on the classical target detection network, resulting a target detection network with networked vehicle vision fusion based on the multi-feature self-learning mechanism; in some embodiments, the network unit based on the multi-feature self-learning mechanism removes redundant features and realizes a complementation and enhancement between features by self-learning weights of multi-source features.

(3) Selecting a networked vehicle to perform a sensing task, recording images captured by forward-looking central cameras of the networked vehicle performing the sensing task and surrounding networked vehicles at the same time, world coordinates and heading directions of respective networked vehicles, inputting the images into the target detection network with networked vehicle vision fusion based on the multi-feature self-learning mechanism, obtaining the intermediate feature maps of all the images by the semantic feature extraction part, compressing the intermediate feature maps of the surrounding networked vehicles and broadcasting the intermediate feature maps together with the world coordinates and heading direction information of the corresponding vehicles.

(4) Receiving, by the networked vehicle performing the sensing task, the broadcast information, decompressing the received intermediate feature maps, and performing affine transformation on the decompressed intermediate feature maps by using the world coordinates of the surrounding networked vehicles and a counterclockwise included angle of the heading directions between the networked vehicles performing the sensing task.

(5) Splicing all the intermediate feature maps which are aligned with the intermediate feature map of the networked vehicle performing the sensing task after the affine transformation and the intermediate feature map of the networked vehicle performing the sensing task sequentially in a channel direction, inputting the spliced feature maps into the network unit based on the multi-feature self-learning mechanism, completing a feature-level fusion of visual images of multiple networked vehicles based on the multi-feature self-learning mechanism, inputting the fused feature maps into a detection head network, and regressing visible obstacle targets in a visual field of the images of the networked vehicle performing the sensing task and obstacle targets blocked by the surrounding networked vehicles.

Further, technical parameters of the forward-looking central cameras of the networked vehicles are the same, and installation heights and positions of the forward-looking central cameras are the same.

Further, a structure of the network unit based on the multi-feature self-learning mechanism includes: an input layer with a size of C*N*w*h, a first layer convolution kernel with a size of C*N*C*N*5*5, a first layer hidden layer with a size of C*N*w*h, a second layer convolution kernel with a size of $$C*N*\frac{C}{2}*N*5*5,$$

a second layer hidden layer with a size of $$\frac{C}{2}*N*w*h,$$

an output layer convolution kernel with a size of $$\frac{C}{2}*N*C*1*1,$$

and an output layer with a size of C*w*h, where C represents a number of channels of input intermediate feature layers, N represents a number of networked vehicles with fused features, w represents a width of an intermediate feature map, h represents a length of the intermediate feature map, and C, N, w and h are all positive integers.

Further, a specific process of the affine transformation is as follows:

(4.1) Recording the networked vehicle performing the sensing task as a networked vehicle $Veh_0$, and expressing a set of the feature map of the networked vehicle $Veh_0$ and the decompressed intermediate feature maps as $F_c = [F_0, F_1, F_2, \ldots, F_{N-1}]$, where $F_0$ represents the intermediate feature map of the networked vehicle $Veh_0$ itself, $F_i$ represents the intermediate feature map of an $i^{th}$ networked vehicle, $0 \leq i \leq (N-1)$; for any $F_i \in F_c$, a size of the intermediate feature map is C*w*h; N-1 represents N-1 networked vehicles around the networked vehicle performing the sensing task.

(4.2) For any $F_i \in F_c$, listing an affine transformation matrix $H_i$ according to the counterclockwise included angle of the heading directions of the networked vehicles i and $Veh_0$ and respective world coordinates.

(4.3) Performing affine transformation on a feature map $F_i$ of the networked vehicle i by using the affine transformation matrix $H_i$, the transformed feature map $F_i'$ is spatially aligned with $F_0$.

(4.4) Performing affine transform on all the intermediate feature maps of $F_i \in F_c$ according to the process of in (4.2)-(4.3), and a set of the transformed and spatially aligned feature maps being expressed as $F_c' = [F_0, F_1', F_2', \ldots, F_N']$.

Further, in step (4.2), by taking the heading direction of the networked vehicle $Veh_0$ as a y direction, and a direction perpendicular to the heading direction as an x direction, for any networked vehicle i, the affine transformation matrix $H_i$ satisfies:

$$H_i = \begin{bmatrix} \cos\theta_i & -\sin\theta_i & \Delta x_i * \frac{w}{2M} \\ \sin\theta_i & \cos\theta_i & \Delta y_i * \frac{h}{2M} \\ 0 & 0 & 1 \end{bmatrix}$$

where $\Delta x_i$ represents a distance between the networked vehicles i and $Veh_0$ in the horizontal x direction, $\Delta y_i$ represents a distance between the networked vehicles i and $Veh_0$ in the vertical y direction, and $\theta_i$ represents a counterclockwise included angle between the heading direction of the networked vehicle i and the heading direction of $Veh_0$.

Further, in step (4.3), it is assumed that a coordinate of any point value on the feature map $F_i$ is $(x_i, y_i)$, then a coordinate $(x_i', y_i')$ of the point value on the feature map $F_i'$ after the affine transformation satisfies:

$$\begin{pmatrix} x_i' \\ y_i' \\ 1 \end{pmatrix} = H_i * \begin{pmatrix} x_i \\ y_i \\ 1 \end{pmatrix} = \begin{bmatrix} \cos\theta_i & -\sin\theta_i & \Delta x_i * \frac{w}{2M} \\ \sin\theta_i & \cos\theta_i & \Delta y_i * \frac{h}{2M} \\ 0 & 0 & 1 \end{bmatrix} \begin{pmatrix} x_i \\ y_i \\ 1 \end{pmatrix}$$

that is, when $$0 \leq \cos\theta_i * x_i - \sin\theta_i * y_i + \Delta x_i + \frac{w}{2M} < w,$$

$$0 \leq \sin\theta_i * x_i + \cos\theta_i * y_i + \Delta y_i * \frac{h}{2M} < h:$$

$$x_i' = \cos\theta_i * x_i - \sin\theta_i * y_i + \Delta x_i * \frac{w}{2M};$$

$$y_i' = \sin\theta_i * x_i + \cos\theta_i * y_i + \Delta y_i * \frac{h}{2M}.$$

Further, for the transformed feature map $F_i'$, the coordinates with missing point values on the feature map $F_i'$ are all filled with 0.

Further, the number of surrounding networked vehicles is selected according to a radius threshold between the surrounding networked vehicles and the networked vehicle performing the sensing task; the forward-looking central camera of the networked vehicle performing the sensing task is taken as an origin, and the N-1 networked vehicles closest to the origin within the radius threshold of M meters from the origin and with a vertical coordinate greater than 0 are searched, and the radius threshold M and the number of selected networked vehicles are set according to actual requirements.

Further, when the number of networked vehicles searched is less than N-1, values of the intermediate feature map corresponding to the number of missing vehicles are all filled with 0.

In another aspect, the present application further provides a visual enhancement system based on fusion of spatially aligned features of multiple networked vehicles, in some embodiments, each networked vehicle is equipped with the system, and the system includes a coordinate recording module, an image acquisition module, an input module, a multi-networked vehicle spatially aligned feature fusion network module, a feature compression module, an information broadcasting module, an information receiving module, a feature decompression module, an affine transformation module and an output module.

The coordinate recording module is used for recording world coordinates and a heading direction of a networked vehicle itself and transmitting the world coordinates and the heading direction to the information broadcasting module.

The image acquisition module is used for acquiring images captured by a forward-looking central camera installed on a roof of the networked vehicle and transmitting the images to the input module.

The multi-networked vehicle spatially aligned feature fusion network module includes a semantic feature extraction module, a network module based on a multi-feature self-learning mechanism and a detection head module; the network module based on the multi-feature self-learning mechanism removes redundant features and realizes the complementation and enhancement between features by self-learning weights of multi-source features.

The input module is used for inputting images into the semantic feature extraction module in the multi-networked vehicle spatially aligned feature fusion network module.

The semantic feature extraction module is used for obtaining an intermediate feature map of the images and transmitting the intermediate feature map to the feature compression module.

The feature compression module is used for compressing the intermediate feature map and transmitting the compressed intermediate feature map to the information broadcasting module.

The information broadcasting module is used for broadcasting the compressed intermediate feature map together with the world coordinates and the heading direction information.

The information receiving module is used for receiving broadcast information of the information broadcasting modules of other surrounding networked vehicles and transmitting the broadcast information to the feature decompression module.

The feature decompression module is used for decompressing the intermediate feature maps of the surrounding networked vehicles, and transmitting the world coordinates, the heading directions and the decompressed intermediate feature maps of the surrounding networked vehicles to the affine transformation module.

The affine transformation module is used for performing affine transformation on the decompressed intermediate feature maps of the surrounding networked vehicles according to the world coordinates of the surrounding networked vehicles and the counterclockwise included angle of the heading directions of the networked vehicle itself, and spatially aligning the intermediate feature maps with the intermediate feature map of the networked vehicle itself; splicing the intermediate feature maps after spatial alignment with the intermediate feature map of the networked vehicle itself in sequence according to a channel direction, and transmitting the spliced feature maps to the network module based on the multi-feature self-learning mechanism in the multi-networked vehicle spatially aligned feature fusion network module.

The network module based on the multi-feature self-learning mechanism is used for completing a feature-level fusion of visual images of multiple networked vehicles based on the multi-feature self-learning mechanism according to the spliced feature maps, and inputting the fused feature maps into the detection head module in the multi-networked vehicle spatially aligned feature fusion network module.

The detection head module is used for obtaining an obstacle sensing result within a visual field of the images of the networked vehicle itself and inputting the obstacle sensing result to the output module.

The output module is used for obtaining visible obstacle targets and obstacle targets blocked by surrounding networked vehicles according to the obstacle sensing result.

The present application has the beneficial effects that the present application provides a visual enhancement method and system based on fusion of spatially aligned features of multiple networked vehicles, and designs a target detection network based on a multi-feature self-learning mechanism. After receiving the compressed intermediate feature map of the networked vehicles in a certain range around, the decompressed intermediate feature map is subjected to affine transformation by comprehensively utilizing the world coordinates of the networked vehicles and the included angle between the heading directions, and the transformed aligned feature map is subjected to feature fusion by using the network unit based on the multi-feature self-learning mechanism, so as to realize the complementation and enhancement among features while removing redundant features, which improves the accuracy and success rate of vision-based obstacle detection for networked vehicles and further improves the safety of vehicle driving.

DESCRIPTION OF EMBODIMENTS

The object and effect of the present application will become clearer when the present application is described in detail according to the attached drawings. It should be understood that the specific embodiments described here are only used to explain the present application, and are not used to limit the present application.

Figure 1:
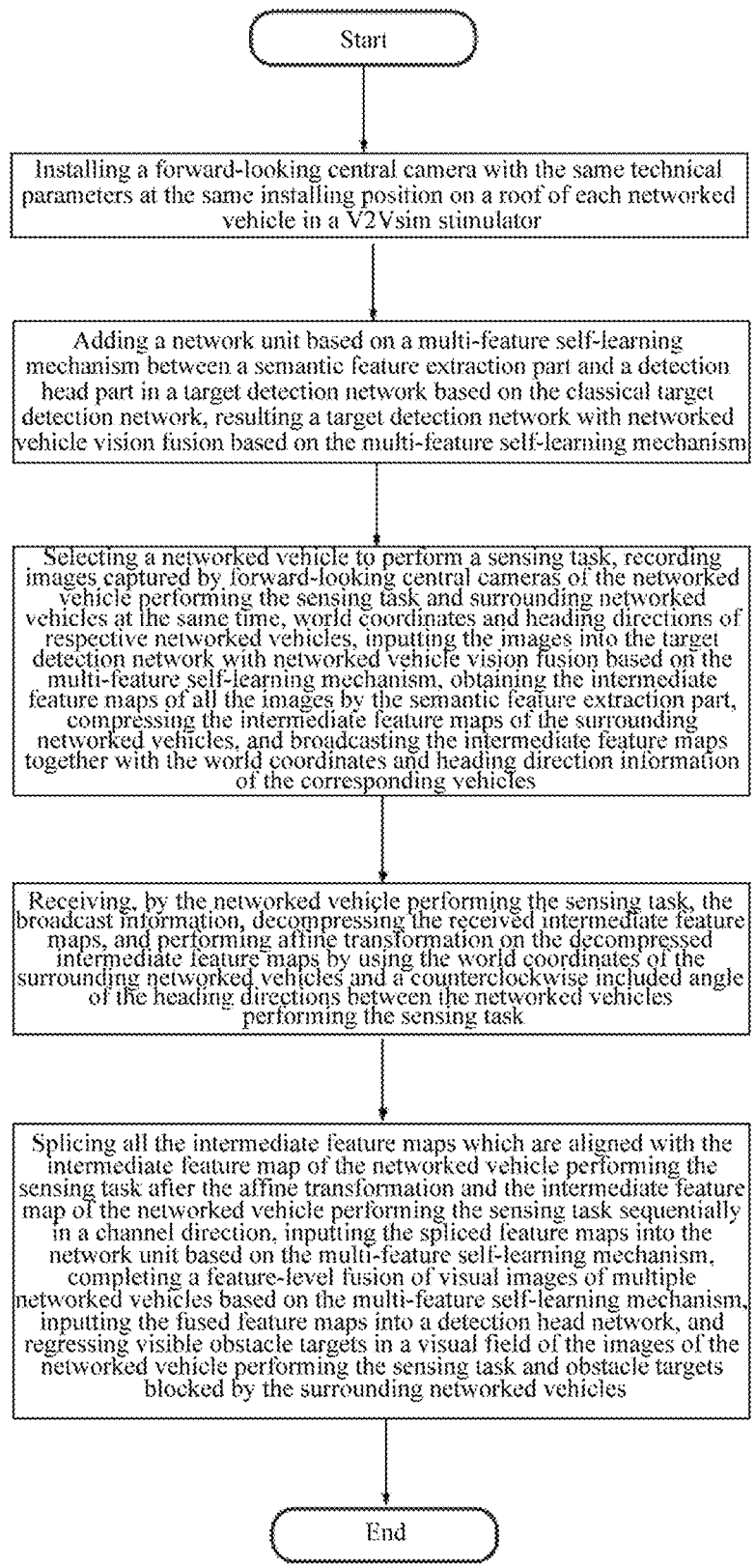
FIG. 1 is a flowchart of a visual enhancement method based on fusion of spatially aligned features of multiple networked vehicles provided by the present application.

As shown in FIG. 1, the present application provides a visual enhancement method based on fusion of spatially aligned features of multiple networked vehicles, which is used to eliminate the blind spots of a networked vehicle blocked by surrounding networked vehicles and solve the driving safety problem of networked vehicles caused by the inability to detect and identify obstacles in the blind spots. A network unit based on the multi-feature self-learning mechanism designed by the present application studies the self-learning feature weight mechanism of multi-feature maps, performs feature fusion on spatially aligned feature maps, extracts important intermediate features, ignores unimportant intermediate features, and realizes the complementation and enhancement among features while removing redundant features. The fused intermediate features are used to detect the target obstacles from the perspective of the networked vehicle itself and those partially or completely blocked, which improves the accuracy and success rate of the vision-based obstacle detection of the networked vehicle.

This specific embodiment is realized by simulation, including the following steps:

(1) A V2Vsim simulator is used to simulate the driving of networked vehicles and the communication between the networked vehicles; the roof of each networked vehicle is equipped with a forward-looking central camera with the same technical parameters, and the installation height and position of the camera are consistent; the V2Vsim simulator can simulate the driving behavior of networked vehicles in a complex traffic environment, and communication between the networked vehicles (V2V); V2V uses wireless network to transmit communication information (such as long-distance transmission (LTE-V2X)), covering up to 300 meters, and can transmit information such as original video image data or image intermediate feature map data, vehicle position/speed/orientation angle, etc.; the information transmission mode is broadcast, that is, networked vehicles within a certain range around can receive information; the transmission delays of data with different sizes are different, and the larger the amount of data transmitted, the longer the transmission delay; in order to reduce the inter-vehicle transmission delay and improve the real-time performance of networked vehicle detection, compressed intermediate feature maps are used for transmission here to reduce the transmission delay.

Figure 2:
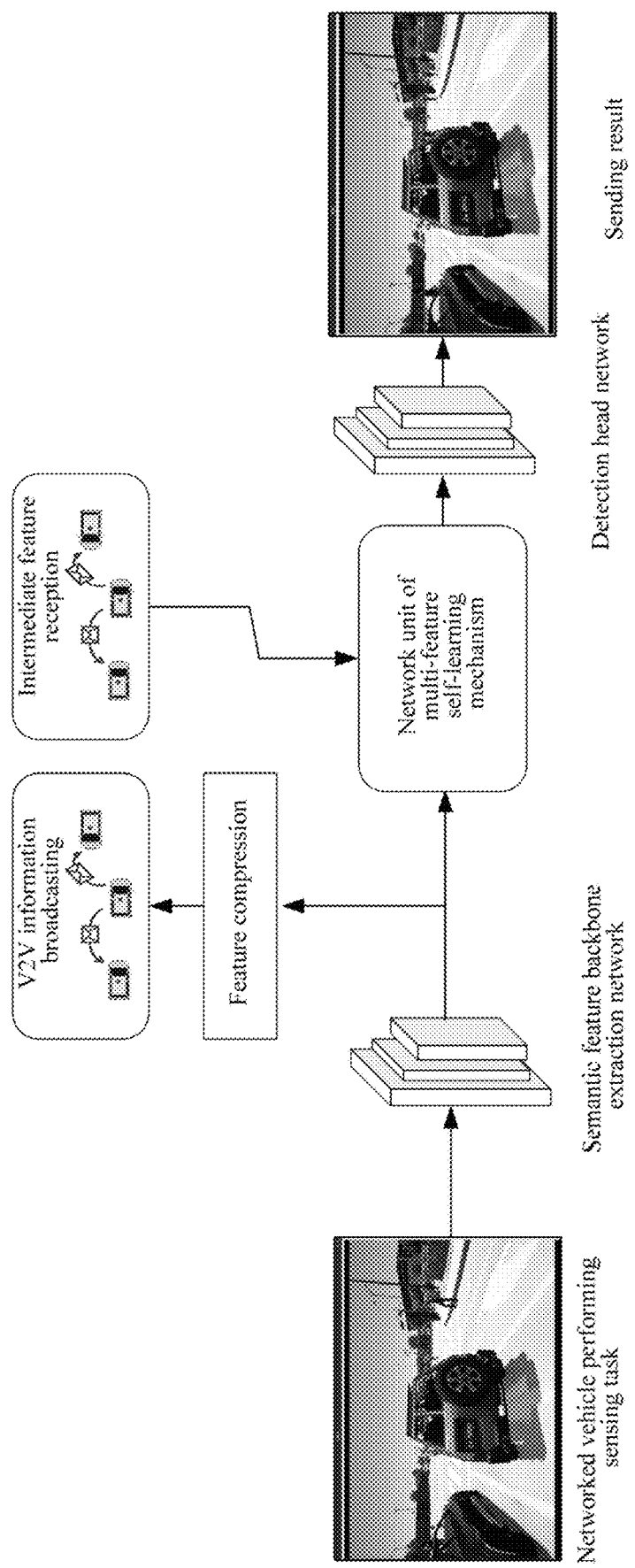
FIG. 2 is an architecture diagram of a target detection network based on a multi-feature self-learning mechanism and visual fusion of networked vehicles.

(2) A target detection network based on a multi-feature self-learning mechanism and visual fusion of networked vehicles is designed, as shown in FIG. 2. On the basis of a traditional target detection network, a network unit based on a multi-feature self-learning mechanism is added; after receiving the compressed intermediate feature maps of the networked vehicles in a certain range around, the decompressed intermediate feature map is subjected to affine transformation by comprehensively utilizing the world coordinates of the networked vehicles and the counterclockwise included angle between the heading directions, and the aligned feature maps are spliced according to the channel direction and input into the network unit based on the multi-feature self-learning mechanism for feature-level fusion; by means of self-learning weights of multi-source features, the complementary and enhancement among features are realized while removing redundant features; the fused features are input into the detection head network, and the visible obstacle targets in the visual field of the images of the networked vehicle and the obstacle targets blocked by the surrounding networked vehicles are regressed.

This step is the core of the present application and is divided into the following sub-steps:

(2.1) Based on a Yolov5s target detection network, a Yolov5s network is divided into two parts: a semantic feature backbone extraction network and a detection head network, and a network unit based on multi-feature self-learning mechanism is added between these two parts; the structure of the network unit based on the multi-feature self-learning mechanism includes: an input layer with a size of $C*N*w*h$, a first layer convolution kernel with a size of $C*N*C*N*5*5$, a first layer hidden layer with a size of $C*N*w*h$, a second layer convolution kernel with a size of $$C*N*\frac{C}{2}*N*5*5,$$

a second layer hidden layer with a size of $$\frac{C}{2}*N*w*h,$$

an output layer convolution kernel with a size of $$\frac{C}{2}*N*C*1*1,$$

and an output layer with a size of $C*w*h$, where C represents a number of channels of input intermediate feature layers, N represents a number of networked vehicles with fused features, w represents a width of an intermediate feature map, h represents a length of the intermediate feature map, and C, N, w and h are all positive integers; in this embodiment, N is set to be 4, which is an empirical value and is determined by the average number of networked vehicles that may cause blocking within the visual field of a networked vehicle, the feature transmission delay and the feature fusion efficiency; C, w, and h are 256, 12, and 20, respectively, where C represents the number of channels in the intermediate features; the input of the network unit of the feature self-learning mechanism of the method of the present application is the intermediate feature map of the multiple networked vehicles spliced in the channel direction, and the size of the output intermediate feature map is considered as the size of the intermediate feature map of a networked vehicle, and the purpose is not only to learn the features of multi-source networked vehicles, complement and enhance the features, but also to reduce the number of features and improve the reasoning efficiency of the network.

(2.2) For $Veh_0$, a networked vehicle that needs to perform the sensing task, the forward-looking central camera of the networked vehicle is taken as the origin, the N−1 networked vehicles closest to the origin within the radius threshold of M meters from the origin and having a vertical coordinate of greater than 0 are searched, and the N networked vehicles and the images captured by the forward-looking central cameras at the same time, their respective world coordinates, and the angles of the heading directions of the N vehicles at this time are recorded; the images taken by the forward-looking central camera of the $Veh_0$ itself and those taken by the forward-looking central cameras of the searched N−1 networked vehicles at the same time are respectively input into the semantic feature backbone extraction network to obtain the intermediate feature maps of the forward-looking central camera images of the N networked vehicles; if the number of searched vehicles is less than N−1, all the values of the intermediate feature map corresponding to the missing vehicles are filled with zero values; the intermediate feature maps of the searched N−1 networked vehicles are compressed, and the compressed intermediate feature maps and the information of the world coordinates and the heading directions of the vehicles are broadcast.

(2.3) The networked vehicle $Veh_0$ receives the broadcast information, decompresses the received intermediate feature map, and performs affine transformation on the decompressed intermediate feature maps by comprehensively utilizing the world coordinates of the networked vehicles and the counterclockwise included angle of the heading directions, in some embodiments, the affine transformation uses an affine transformation matrix between different coordinate systems of the networked vehicles to transform the intermediate feature maps generated in different vehicle coordinate systems into the coordinate system of networked vehicle $Veh_0$, so as to realize the spatial alignment of the feature maps; the details are as follows:

1) A set of the feature map of the networked vehicle $Veh_0$ and the decompressed intermediate feature maps is expressed as $F_c=[F_0, F_1, F_2, \ldots, F_{N-1}]$, where $F_0$ is the intermediate feature map of the networked vehicle $Veh_0$ itself, $F_i(0 \le i \le (N-1))F_i$ is the intermediate feature map of an $i^{th}$ networked vehicle; for any $F_i \in F_c(0 \le i \le (N-1))$, the size thereof is $C*w*h$.

2) For any $F_i \in F_c(0 \le i \le (N-1))$, an affine transformation matrix $H_i$ is listed according to the counterclockwise included angle of the heading directions between the networked vehicles i and $Veh_0$ and their respective world coordinates.

By taking the heading direction of the networked vehicle $Veh_0$ as a y direction, and a direction perpendicular to the heading direction as an x direction, for any networked vehicle i, the affine transformation matrix $H_i$ satisfies:

$$H_i = \begin{bmatrix} \cos\theta_i & -\sin\theta_i & \Delta x_i * \frac{w}{2M} \\ \sin\theta_i & \cos\theta_i & \Delta y_i * \frac{h}{2M} \\ 0 & 0 & 1 \end{bmatrix}$$

where $\Delta x_i$ represents a distance between the networked vehicles i and $Veh_0$ in the horizontal x direction, $\Delta y_i$ represents a distance between the networked vehicles i and $Veh_0$ in the vertical y direction, and $\theta_i$ is a counterclockwise included angle between the heading direction of the networked vehicle i and the heading direction of $Veh_0$.

3) Affine transformation is performed on the feature map $F_i$ of the networked vehicle i by using the affine transformation matrix $H_i$, and the transformed feature map $F_i$ is spatially aligned with $F_0$; it is assumed that a coordinate of any point value on the feature map $F_i$ is $(x_i, y_i)$, then a coordinate $(x_i', y_i')$ thereof after the affine transformation satisfies:

$$\begin{pmatrix} x_i' \\ y_i' \\ 1 \end{pmatrix} = H_i * \begin{pmatrix} x_i \\ y_i \\ 1 \end{pmatrix} = \begin{bmatrix} \cos\theta_i & -\sin\theta_i & \Delta x_i * \frac{w}{2M} \\ \sin\theta_i & \cos\theta_i & \Delta y_i * \frac{h}{2M} \\ 0 & 0 & 1 \end{bmatrix} \begin{pmatrix} x_i \\ y_i \\ 1 \end{pmatrix}$$

that is, when $$0 \le \cos\theta_i * x_i - \sin\theta_i * y_i + \Delta x_i * \frac{w}{2M} < w,$$

$$0 \le \sin\theta_i * x_i + \cos\theta_i * y_i + \Delta y_i * \frac{h}{2M} < h;$$

$$x_i' = \cos\theta_i * x_i - \sin\theta_i * y_i + \Delta x_i * \frac{w}{2M};$$

$$y_i' = \sin\theta_i * x_i + \cos\theta_i * y_i + \Delta y_i * \frac{h}{2M}.$$

For the transformed feature map $F_i'$, the coordinates with missing point values on the feature map $F_i'$ are all filled with 0 values. The above zero-value filling method is a processing method for missing values, which means that the missing values are invalid and have no influence on subsequent feature fusion.

4) Affine transformation is performed on all the intermediate feature maps of $F_i \in F_c(1 \le i \le (N-1))$ according to the method of 2)-3), and a set of the transformed and spatially aligned feature maps is expressed as $F_c'=[F_0, F_1', F_2', \ldots, F_N']$.

Figure 3:
FIG. 3 is a schematic diagram of the blind area obstacles detected by the networked vehicle performing the sensing task in a V2Vsim simulator.

(2.4) All the intermediate feature maps in the set $F_c'$ are spliced in sequence according to the channel direction, and the spliced feature maps are input into the network unit based on the multi-feature self-learning mechanism, thereby completing the feature-level fusion of the visual images of N networked vehicles based on the multi-feature self-learning mechanism, and the fused feature maps are input into the detection head network to regress the visible obstacle targets in the visual field of the networked vehicle and the obstacle targets blocked by the surrounding networked vehicles, as shown in FIG. 3.

The above obstacle detection method is based on the deep learning network detection and identification method. In this example, a lightweight Yolov5s network is adopted. The Yolov5s network model is a one-stage network, which can regress the positions of obstacles in the images from the input images by one deduction. Here, the networked vehicle multi-feature fusion unit is placed between the Yolov5s semantic feature backbone extraction network and the detection head network, and the purpose is that the semantic feature backbone extraction network extracts the deep information of high-level semantic feature images, which is a high-level expression of image data color features, texture features, shape features and spatial relationship features, and is more suitable for feature fusion, while he detection head network part uses advanced semantic features to detect a specific object target in the image of interest, and can obtain the category information and position information of this target at the same time.

Based on the features of the networked vehicles, the above fusion method integrates the forward-looking image features of the surrounding networked vehicles, and can detect the obstacle objects blocked by the surrounding networked vehicles from the perspective of the surrounding networked vehicles, and performs affine transformation on the intermediate feature maps from the perspective of the surrounding networked vehicles, unifies the feature map coordinates in different spatial positions to the same coordinate, expands the visual field of a single networked vehicle and makes up for the visual blind spots.

The above-mentioned intermediate feature compression method adopts the Huffman algorithm, which can compress the intermediate feature maps to a quarter of the original, and the transmission delay of the feature map is also reduced to a quarter of the original.

Step 3, in the V2Vsim simulation simulator, a large number of data including visual images, world coordinates and heading angles of the networked vehicle itself and the surrounding networked vehicles at the same time in the traffic environment where the target obstacle is partially blocked or completely blocked are generated; the data is divided into a training set, a verification set and a test set, and the number ratio of the training set, the verification set and the test set meets 6:2:2; the target detection network of networked vehicles based on the multi-feature self-learning mechanism described in step 2 is trained with the training set until the network converges normally and the accuracy is greater than a certain threshold; the threshold is an empirical value; experiments show that when the threshold is set to 0.9, the network can basically detect blocked obstacles, and the detection effect is in line with expectations.

The above-mentioned network accuracy is an index mAP (mean average precision) to measure the detection accuracy, which comprehensively represents the accuracy and recall rate of the detection network, and is a commonly used index to measure the performance of the detection network.

Step 4, the network trained in step 3 is used, obstacle detection based on visual images is performed on the networked vehicle with blocking of target obstacles, so as to achieve high accuracy and success rate in detecting the blocked target obstacles. The accuracy of obstacle detection (mAP) of the trained target detection network is improved by 2.75 percentage points compared with that of a single networked vehicle, and the accuracy of obstacle detection in a blind area is improved by 67%.

Figure 4:
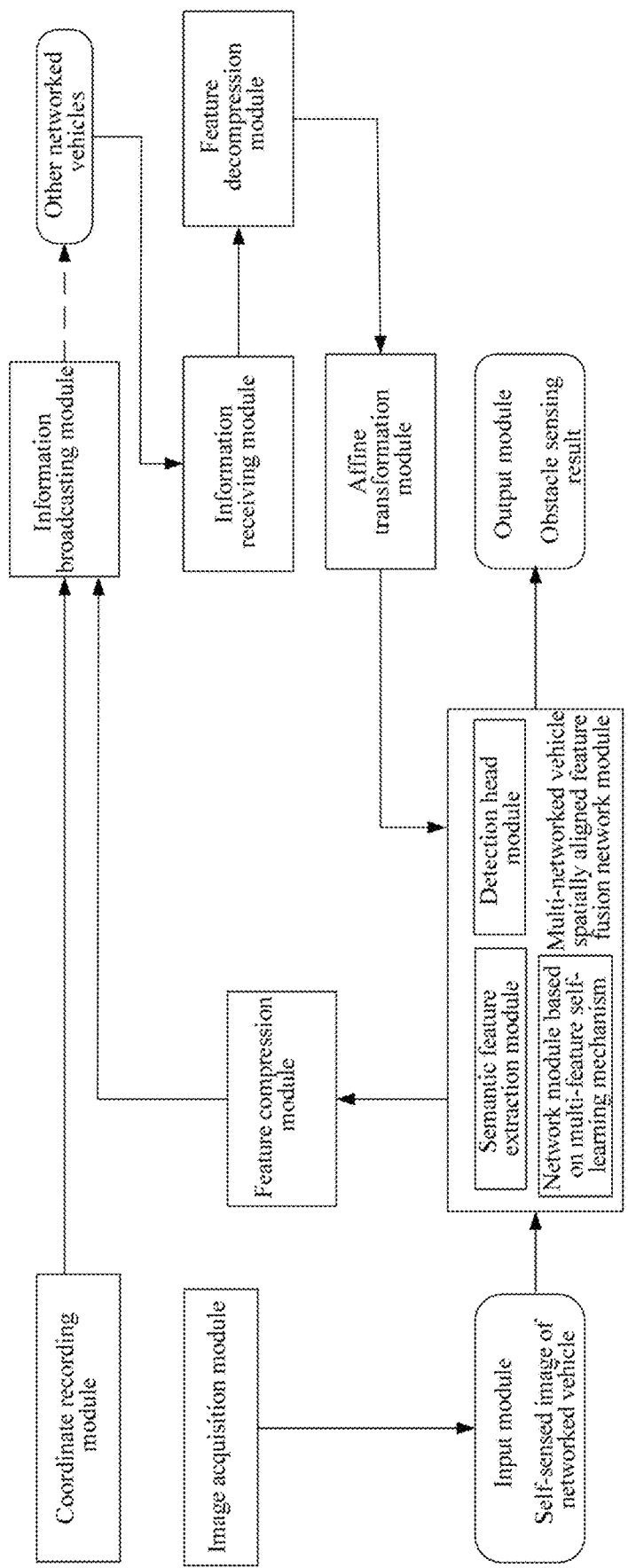
FIG. 4 is a structural diagram of a visual enhancement system based on fusion of spatially aligned features of multiple networked vehicles provided by the present application.

As shown in FIG. 4, corresponding to the visual enhancement method based on fusion of spatially aligned features of multiple networked vehicles, the present application also provides a visual enhancement system based on fusion of spatially aligned features of multiple networked vehicles, and each networked vehicle is equipped with the system, which includes a coordinate recording module, an image acquisition module, an input module, a multi-networked vehicle spatially aligned feature fusion network module, a feature compression module, an information broadcasting module, an information receiving module, a feature decompression module, an affine transformation module and an output module.

The coordinate recording module is configured for recording world coordinates and a heading direction of a networked vehicle itself and transmitting the world coordinates and the heading direction to the information broadcasting module.

The image acquisition module is configured for acquiring images captured by a forward-looking central camera installed on a roof of the networked vehicle and transmitting the images to the input module.

The multi-networked vehicle spatially aligned feature fusion network module includes a semantic feature extraction module, a network module based on a multi-feature self-learning mechanism and a detection head module; the network module based on the multi-feature self-learning mechanism removes redundant features and realizes the complementation and enhancement between features by self-learning weights of multi-source features.

The input module is configured for inputting images into the semantic feature extraction module in the multi-networked vehicle spatially aligned feature fusion network module.

The semantic feature extraction module is configured for obtaining an intermediate feature map of the images and transmitting the intermediate feature map to the feature compression module.

The feature compression module is configured for compressing the intermediate feature map and transmitting the compressed intermediate feature map to the information broadcasting module.

The information broadcasting module is configured for broadcasting the compressed intermediate feature map together with the world coordinates and the heading direction information.

The information receiving module is configured for receiving broadcast information of the information broadcasting modules of other surrounding networked vehicles and transmitting the broadcast information to the feature decompression module.

The feature decompression module is configured for decompressing the intermediate feature maps of the surrounding networked vehicles, and transmitting the world coordinates, the heading directions and the decompressed intermediate feature maps of the surrounding networked vehicles to the affine transformation module.

The affine transformation module is configured for performing affine transformation on the decompressed intermediate feature maps of the surrounding networked vehicles according to the world coordinates of the surrounding networked vehicles and the counterclockwise included angle of the heading directions of the networked vehicle itself, and spatially aligning the intermediate feature maps with the intermediate feature map of the networked vehicle itself; splicing the intermediate feature maps after spatial alignment with the intermediate feature map of the networked vehicle itself in sequence according to a channel direction, and transmitting the spliced feature maps to the network module based on the multi-feature self-learning mechanism in the multi-networked vehicle spatially aligned feature fusion network module.

The network module based on the multi-feature self-learning mechanism is configured for completing a feature-level fusion of visual images of multiple networked vehicles based on the multi-feature self-learning mechanism according to the spliced feature maps, and inputting the fused feature maps into the detection head module in the multi-networked vehicle spatially aligned feature fusion network module.

The detection head module is configured for obtaining an obstacle sensing result within a visual field of the images of the networked vehicle itself and inputting the obstacle sensing result to the output module.

The output module is configured for obtaining visible obstacle targets and obstacle targets blocked by surrounding networked vehicles according to the obstacle sensing result.

For the specific process of function execution of the above modules, please refer to the embodiment of a visual enhancement method based on fusion of spatially aligned features of multiple networked vehicles provided by the present application.

Corresponding to the embodiment of the visual enhancement method based on the spatially aligned feature fusion of multiple networked vehicles, the present application also provides an embodiment of the visual enhancement device based on the spatially aligned feature fusion of multiple networked vehicles.

Figure 5:
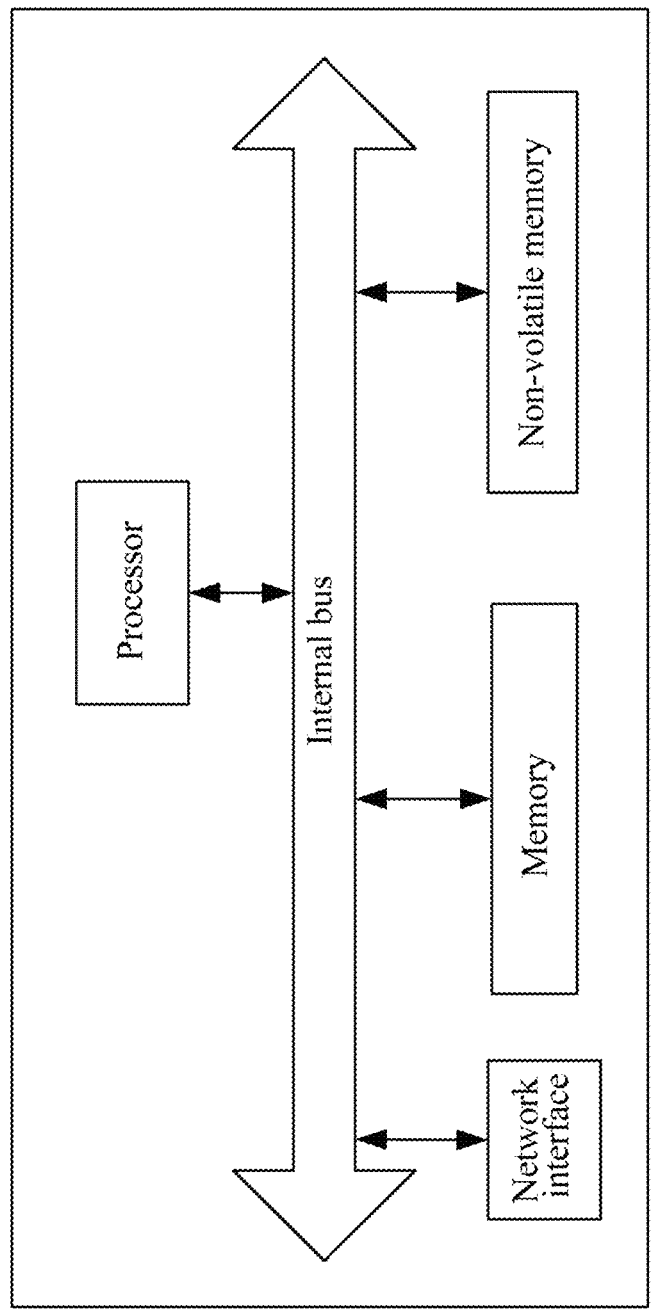
FIG. 5 is a structural diagram of a visual enhancement device based on fusion of spatially aligned features of multiple networked vehicles provided by the present application.

Referring to FIG. 5, a visual enhancement device based on fusion of spatially aligned features of multiple networked vehicles provided by an embodiment of the present application includes a memory and one or more processors, in some embodiments the memory stores executable codes, and when the executable codes are executed by the processors, the visual enhancement method based on fusion of spatially aligned features of multiple networked vehicles in the above embodiment is implemented.

The embodiment of the visual enhancement device based on fusion of spatially aligned features of multiple networked vehicles of the present application can be applied to any equipment with data processing capability, which can be devices or apparatuses such as computers. The embodiment of the device can be realized by software, or by hardware or a combination of hardware and software. Taking software implementation as an example, as a logical device, it is formed by reading the corresponding computer program instructions in the non-volatile memory into the memory through the processor of any equipment with data processing capability. From the hardware level, as shown in FIG. 5, it is a hardware structure diagram of any equipment with data processing capability where the remote supervision named entity identification device based on semi-training and sentence selection of the present application is located. In addition to the processor, memory, network interface and nonvolatile memory shown in FIG. 5, any equipment with data processing capability where the device is located in the embodiment usually includes other hardware according to the actual function of the equipment with data processing capability, which will not be described here again.

The implementing process of the functions and functions of each unit in the above-mentioned device is detailed in the implementing process of the corresponding steps in the above-mentioned method, and will not be repeated here.

For the device embodiment, since it basically corresponds to the method embodiment, it is only necessary to refer to part of the description of the method embodiment for the relevant points. The device embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present application. Those skilled in the art can understand and implement it without creative labor.

The embodiment of the present application also provides a computer-readable storage medium, on which a program is stored, in some embodiments when executed by a processor, the program implements the visual enhancement method based on fusion of spatially aligned features of multiple networked vehicles in the above embodiment.

The computer-readable storage medium can be an internal storage unit of any equipment with data processing capability as described in any of the previous embodiments, such as a hard disk or a memory. The computer-readable storage medium can also be an external storage device of any device with data processing capability, such as a plug-in hard disk, Smart Media Card (SMC), SD card, Flash Card and the like provided on the device. Further, the computer-readable storage medium can also include both internal storage units and external storage devices of any device with data processing capability. The computer-readable storage medium is used for storing the computer program and other programs and data required by any equipment with data processing capability, and can also be used for temporarily storing data that has been output or will be output.

The above-mentioned embodiments are used to explain, rather than to limit the present application. Any modification and change made to the present application within the scope of protection of the spirit and claims of the present application fall within the scope of protection of the present application.

What is claimed is:

1. A visual enhancement method based on fusion of spatially aligned features of multiple networked vehicles, comprising the following steps:

(1) installing a forward-looking central camera on a roof of each networked vehicle;

(2) adding a network unit based on a multi-feature self-learning mechanism between a semantic feature extraction part and a detection head part in a target detection network based on a classical target detection network, resulting a target detection network with networked vehicle vision fusion based on the multi-feature self-learning mechanism; wherein the network unit based on the multi-feature self-learning mechanism removes redundant features and realizes a complementation and enhancement between features by self-learning weights of multi-source features; a structure of the network unit based on the multi-feature self-learning mechanism comprises: an input layer has a size of $C*N*w*h$, a first layer convolution kernel has a size of $C*N*C*N*5*5$, a first layer hidden layer with a size of $C*N*w*h$, a second layer convolution kernel with a size of $$C*N*\frac{C}{2}*N*5*5,$$

a second layer hidden layer with a size of $$\frac{C}{2}*N*w*h,$$

an output layer convolution kernel with a size of $$\frac{C}{2}*N*C*1*1,$$

and an output layer with a size of $C*w*h$, wherein C represents a number of channels of input intermediate feature layers, N represents a number of networked vehicles with fused features, w represents a width of an intermediate feature map, h represents a length of the intermediate feature map, and C, N, w and h are all positive integers;

(3) selecting a networked vehicle to perform a sensing task, recording images captured by forward-looking central cameras of the networked vehicle performing the sensing task and surrounding networked vehicles at the same time, world coordinates and heading directions of respective networked vehicles, inputting the images into the target detection network with networked vehicle vision fusion based on the multi-feature self-learning mechanism, obtaining the intermediate feature maps of all the images by the semantic feature extraction part, compressing the intermediate feature maps of the surrounding networked vehicles, and broadcasting the intermediate feature maps together with the world coordinates and heading direction information of the corresponding vehicles;

(4) receiving, by the networked vehicle performing the sensing task, the broadcast information, decompressing the received intermediate feature maps, and performing affine transformation on the decompressed intermediate feature maps by using the world coordinates of the surrounding networked vehicles and a counterclockwise included angle between the heading direction of the networked vehicle performing the sensing task and the heading direction of a surrounding networked vehicle; and (5) splicing all the intermediate feature maps which are aligned with the intermediate feature map of the networked vehicle performing the sensing task after the affine transformation and the intermediate feature map of the networked vehicle performing the sensing task sequentially in a channel direction, inputting the spliced feature maps into the network unit based on the multi-feature self-learning mechanism, completing a feature-level fusion of visual images of multiple networked vehicles based on the multi-feature self-learning mechanism, inputting the fused feature maps into a detection head network, and regressing visible obstacle targets in a visual field of the images of the networked vehicle performing the sensing task and obstacle targets blocked by the surrounding networked vehicles.

2. The visual enhancement method based on fusion of spatially aligned features of multiple networked vehicles according to claim 1, wherein technical parameters of the forward-looking central cameras of the networked vehicles are the same, and installation heights and positions of the forward-looking central cameras are the same.

3. The visual enhancement method based on fusion of spatially aligned features of multiple networked vehicles according to claim 1, wherein a process of the affine transformation comprises the following sub-steps:

(4.1) recording the networked vehicle performing the sensing task as a networked vehicle $Veh_0$, and expressing a set of the feature map of the networked vehicle $Veh_0$ and the decompressed intermediate feature maps as $F_c=[F_0, F_1, F_2, \ldots, F_{N-1}]$, where $F_0$ represents the intermediate feature map of the networked vehicle $Veh_0$, $F_i$ represents the intermediate feature map of an $i^{th}$ networked vehicle, $0 \leq i \leq (N-1)$; for any $F_i \in F_c$, a size of the intermediate feature map is $C*w*h$; $N-1$ represents $N-1$ networked vehicles around the networked vehicle performing the sensing task;

(4.2) for any $F_i \in F_c$, listing an affine transformation matrix $H_i$ according to the counterclockwise included angle between the heading direction of the networked vehicle i and the heading direction of $Veh_0$ and respective world coordinates;

(4.3) performing affine transformation on a feature map $F_i$ of the networked vehicle i by using the affine transformation matrix $H_i$, wherein the transformed feature map $F_i'$ is spatially aligned with $F_0$; and (4.4) performing affine transform on all the intermediate feature maps of $F_i \in F_C$ according to the process of step (4.2) to step (4.3), wherein a set of the transformed and spatially aligned feature maps is expressed as $F_c'=[F_0, F_1', F_2', \ldots, F_N']$.

4. The visual enhancement method based on fusion of spatially aligned features of multiple networked vehicles according to claim 3, wherein in step (4.2), by taking the heading direction of the networked vehicle $Veh_0$ as a y direction, and a direction perpendicular to the heading direction of $Veh_0$ as an x direction, for any networked vehicle i, the affine transformation matrix $H_i$ satisfies:

$$H_i = \begin{bmatrix} \cos\theta_i & -\sin\theta_i & \Delta x_i * \frac{w}{2M} \\ \sin\theta_i & \cos\theta_i & \Delta y_i * \frac{h}{2M} \\ 0 & 0 & 1 \end{bmatrix}$$

where $\Delta x_i$ represents a distance between the networked vehicles i and $Veh_0$ in the horizontal x direction, $\Delta y_i$ represents a distance between the networked vehicles i and $Veh_0$ in the vertical y direction, $\theta_i$ represents a counterclockwise included angle between the heading direction of the networked vehicle i and the heading direction of $Veh_0$, and M represents a radius threshold.

5. The visual enhancement method based on fusion of spatially aligned features of multiple networked vehicles according to claim 4, wherein in step (4.3), it is assumed that a coordinate of any point value on the feature map $F_i$ is $(x_i, y_i)$, a coordinate $(x_i', y_i')$ of the point value on the feature map $F_i'$ after the affine transformation satisfies:

$$\begin{pmatrix} x_i' \\ y_i' \\ 1 \end{pmatrix} = H_i * \begin{pmatrix} x_i \\ y_i \\ 1 \end{pmatrix} = \begin{bmatrix} \cos\theta_i & -\sin\theta_i & \Delta x_i * \frac{w}{2M} \\ \sin\theta_i & \cos\theta_i & \Delta y_i * \frac{h}{2M} \\ 0 & 0 & 1 \end{bmatrix} \begin{pmatrix} x_i \\ y_i \\ 1 \end{pmatrix}$$

when $$0 \leq \cos\theta_i * x_i - \sin\theta_i * y_i + \Delta x_i * \frac{w}{2M} < w, \text{ and}$$

$$0 \leq \sin\theta_i * x_i + \cos\theta_i * y_i + \Delta y_i * \frac{h}{2M} < h;$$

$$x_i' = \cos\theta_i * x_i - \sin\theta_i * y_i + \Delta x_i * \frac{w}{2M};$$

$$y_i' = \sin\theta_i * x_i + \cos\theta_i * y_i + \Delta y_i * \frac{h}{2M}.$$

6. The visual enhancement method based on fusion of spatially aligned features of multiple networked vehicles according to claim 5, wherein for the transformed feature map $F_i'$, coordinates with missing point values on the feature map $F_i'$ are all filled with 0.

7. The visual enhancement method based on fusion of spatially aligned features of multiple networked vehicles according to claim 3, wherein the number of surrounding networked vehicles is selected according to a radius threshold between the surrounding networked vehicles and the networked vehicle performing the sensing task; the forward-looking central camera of the networked vehicle performing the sensing task is taken as an origin, the N−1 networked vehicles closest to the origin within the radius threshold of M meters from the origin and with a vertical coordinate greater than 0 are searched, and the radius threshold M and the number of selected networked vehicles are set according to actual requirements.

8. The visual enhancement method based on fusion of spatially aligned features of multiple networked vehicles according to claim 7, wherein when the number of networked vehicles searched is less than N−1, values of the intermediate feature map corresponding to the number of missing vehicles are all filled with 0.

9. A visual enhancement system based on fusion of spatially aligned features of multiple networked vehicles, wherein each networked vehicle is equipped with the system, and the system comprises a coordinate recording module, an image acquisition module, an input module, a multi-networked vehicle spatially aligned feature fusion network module, a feature compression module, an information broadcasting module, an information receiving module, a feature decompression module, an affine transformation module and an output module;

the coordinate recording module is configured for recording world coordinates and a heading direction of a networked vehicle and transmitting the world coordinates and the heading direction to the information broadcasting module;

the image acquisition module is configured for acquiring images captured by a forward-looking central camera installed on a roof of the networked vehicle and transmitting the images to the input module;

the multi-networked vehicle spatially aligned feature fusion network module comprises a semantic feature extraction module, a network module based on a multi-feature self-learning mechanism and a detection head module; the network module based on the multi-feature self-learning mechanism is configured for removing redundant features and realizing the complementation and enhancement between features by self-learning weights of multi-source features; a structure of the network module based on the multi-feature self-learning mechanism comprises: an input layer with a size of $C*N*w*h$, a first layer convolution kernel with a size of $C*N*C*N*5*5$, a first layer hidden layer with a size of $C*N*w*h$, a second layer convolution kernel with a size of $$C*N*\frac{C}{2}*N*5*5,$$

a second layer hidden layer with a size of $$\frac{C}{2}*N*w*h,$$

an output layer convolution kernel with a size of $$\frac{C}{2}*N*C*1*1,$$

and an output layer with a size of $C*w*h$, wherein C represents a number of channels of input intermediate feature layers, N represents a number of networked vehicles with fused features, w represents a width of an intermediate feature map, h represents a length of the intermediate feature map, and C, N, w and h are all positive integers;

the input module is configured for inputting images into the semantic feature extraction module in the multi-networked vehicle spatially aligned feature fusion network module;

the semantic feature extraction module is configured for obtaining an intermediate feature map of the images and transmitting the intermediate feature map to the feature compression module;

the feature compression module is configured for compressing the intermediate feature map and transmitting the compressed intermediate feature map to the information broadcasting module;

the information broadcasting module is configured for broadcasting the compressed intermediate feature map together with the world coordinates and the heading direction information;

the information receiving module is configured for receiving broadcast information of the information broadcasting modules of other surrounding networked vehicles and transmitting the broadcast information to the feature decompression module;

the feature decompression module is configured for decompressing the intermediate feature maps of the surrounding networked vehicles, and transmitting the world coordinates, the heading directions and the decompressed intermediate feature maps of the surrounding networked vehicles to the affine transformation module;

the affine transformation module is configured for performing affine transformation on the decompressed intermediate feature maps of the surrounding networked vehicles according to the world coordinates of the surrounding networked vehicles and a counter-clockwise included angle between the heading direction of the networked vehicle and the heading direction of a surrounding networked vehicle, and spatially aligning the intermediate feature maps with the intermediate feature map of the networked vehicle; splicing the intermediate feature maps after spatial alignment with the intermediate feature map of the networked vehicle in sequence according to a channel direction, and transmitting the spliced feature maps to the network module based on the multi-feature self-learning mechanism in the multi-networked vehicle spatially aligned feature fusion network module;

the network module based on the multi-feature self-learning mechanism is configured for completing a feature-level fusion of visual images of multiple networked vehicles based on the multi-feature self-learning mechanism according to the spliced feature maps, and inputting the fused feature maps into the detection head module in the multi-networked vehicle spatially aligned feature fusion network module;

the detection head module is configured for obtaining an obstacle sensing result within a visual field of the images of the networked vehicle and inputting the obstacle sensing result to the output module;

the output module is configured for obtaining visible obstacle targets and obstacle targets blocked by surrounding networked vehicles according to the obstacle sensing result.

\* \* \* \* \*